June 24, 1930.    R. GENENGER    1,767,922
GLASS PLATE FEED TRACK
Filed Jan. 27, 1928
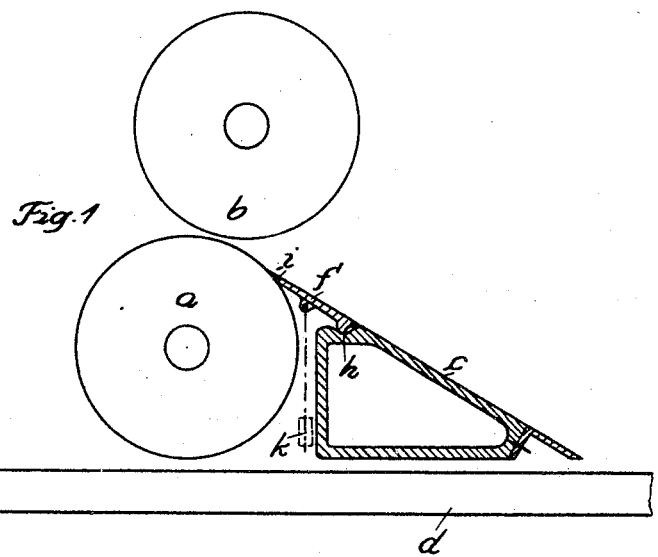
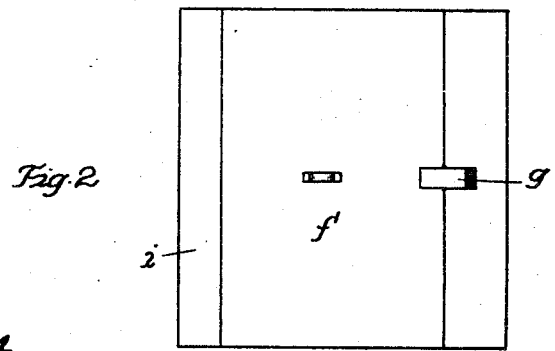
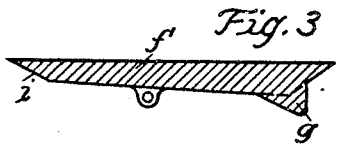
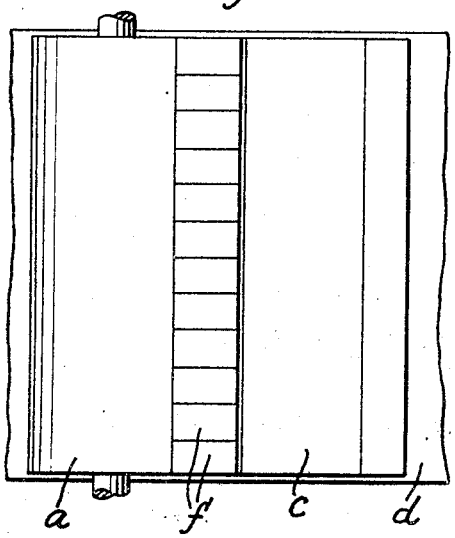
Inventor:
Richard Genenger Patented June 24, 1930

1,767,922

UNITED STATES PATENT OFFICE

RICHARD GENENGER, OF AACHEN-FORST, GERMANY, ASSIGNOR, BY MESNE ASSIGNMENTS, TO THE AMERICAN BICHEROUX COMPANY, A CORPORATION OF DELAWARE

GLASS-PLATE-FEED TRACK

Application filed January 27, 1928. Serial No. 249,956.

This invention relates to tracks for feeding or guiding glass plates, especially glass plates which are still in a hot and plastic condition.

In glass plate feed tracks of this kind comprising a continuous series of feeding or guiding elements which are stationary, movable or rotatable, it is of importance to avoid the formation of slits at the joints between successive elements. When such slits are formed the glass is apt to be caught therein, double over and form creases whereby the value of the resultant product is decreased. Sometimes, if the glass does not quickly free itself from the slits, the feeding operation is interrupted or even stopped altogether. In known glass feed tracks, for instance in connection with the inclined chutes provided between the glass plate rolling mechanism of a glass machine and the transporting tables receiving the rolled plates, it has been a custom to make the edge of the stationary chute adjacent to the lower one of the two forming rolls of such a shape as to form a close fit and conform to the contour of the roll so that it scrapes the surface of the roll for the purpose of ensuring that the hot and plastic glass shall glide off the forming roll to the chute without catching. It is found in practice, however, that owing to the non-uniform heating of the chute same is apt to be distorted, for example, it is particularly apt to arch at the edge adjacent to the forming roll. As a result thereof the chute gets out of contact with the roll and slits are formed which entail the afore-mentioned difficulties. In order to overcome this drawback it has been proposed to leave a gap between the chute and the roll and to cover this gap by a bridge consisting of a number of separate plate-shaped pieces arranged side by side and supported each by one of its edges on the chute and by the opposite edge on the surface of the roll. The division of the bridge into small movable light pieces has for its purpose to provide for a greater expansibility of the bridge and avoid the injurious influence of non-uniform heating which might otherwise entail a twisting or warping of the bridge and the formation of slits.

In the actual use of such a divided bridge between successive elements of glass plate feed tracks, such as between the lower roll of a rolling mechanism and a chute, it has shown that the several pieces forming the bridge become twisted or warped too and also detach from the roll to a certain extent so that again slits are formed between the roll surface and the bridge pieces. This is due to the mounting of the plate-shaped pieces which, in the known construction, rest with their entire front and rear edges on adjacent elements or surfaces of the feed track.

Now, the present invention has for its object to avoid the formation of any slits at the gaps between successive elements of the glass plate feed tracks by the aid of the known divided bridges, this object being attained by mounting the individual pieces of the bridge in such a manner that they are only supported each in one point at the element receiving the glass plate, while they are supported along a line or edge at the element delivering the plate. The single supporting point is preferably formed by a projection on the lower surface of the bridge pieces.

In case the plate-shaped bridge pieces mounted in accordance with the invention become distorted by the non-uniform heating such distortion will be ineffective at the surface from which the glass is being delivered, on the following grounds. For mounting a loose plate same must be supported at three points at least. As with the plate-shaped pieces there is only one point of support at the surface or element receiving the glass plate the other two points of support must be formed at the surface or element delivering the plate. This means that the pieces will always rest by their entire respective edge on the last-said surface or element thus avoiding any formation of slits.

An embodiment of the subject-matter of the invention is illustrated in the accompanying drawing in which:

Fig. 1 is a diagrammatic side elevation, partly in section, of a glass rolling machine with a chute forming a feed track according to the invention;

Fig. 2 is a bottom plan view of one of the bridge pieces on an enlarged scale;

Fig. 3 is a transverse section of the piece shown in Fig. 2, and

Fig. 4 is a top plan view of Figure 1, with the upper forming roll not shown.

$a$ and $b$ are the cooperating rolls designed to roll molten liquid glass into plates. $c$ is a chute on which the glass plates emerging from between the rolls $a$, $b$ glide down to transporting tables $d$. As shown in the drawing, the gap between the lower forming roll $a$ and the chute $c$ is covered by an intermediate bridge. This bridge is composed of a series plate-shaped pieces $f$ arranged side by side on a line parallel of the axes of the rolls $a$, $b$. These plates $f$ are provided on their underside in the middle near their lower edge with a projection $g$. The plates $f$ are freely supported by this projection in a groove $h$ formed on the chute $c$ at the side lying towards the roll $a$. The edges $i$ of the pieces $f$ are shaped to conform to the circumference of the roll $a$ and the plates loosely rest by these edges $i$ on the roll $a$. The edges $i$ by their intimate contact with the roll $a$ act as strippers ensuring a free gliding of the plates formed by the rolls $a$, $b$ from the roll $a$ to the chute $c$. Weights $k$ or other suitable means may be used for holding the plates $f$ in their position.

It will be understood that if the pieces $f$ should become distorted owing to non-uniform heating, they will nevertheless remain mounted as shown, that is to say they will remain supported at three points. As only one of these points lies on the chute—formed by the projection $g$—the other two points of support must be formed by the edge $i$ on the roll $a$, which means that the edge $i$ is held in contact with the roll $a$ thus avoiding any formation of slits at the roll.

While the bridge composed of a series of pieces $f$ according to the invention is shown in connection with a glass rolling machine between the lower forming roll and a chute, such bridges may be used in connection with any glass plate feed tracks at all points where the glass plate has to pass from one element of the track to another one. In this respect, it is without any importance whether the elements of the track are stationary, movable or rotatable.

Having thus described my invention, what I claim as new and desire to secure by Letters Patent, is:—

1. In a glass plate feed track consisting of successive spaced elements, a bridge between adjacent elements, this bridge being composed of a number of separate plate-shaped pieces arranged side by side transversely of the track, each of the said pieces being mounted to rest by one of its edges on the track element delivering the glass plate and to be supported under its opposite edge in contact with the succeeding track element receiving the glass plate, with a support narrower than the plate-shaped piece.

2. In a glass plate feed track consisting of successive spaced elements, a bridge between adjacent elements, this bridge being composed of a number of separate plate-shaped pieces arranged side by side transversely of the track, each of said pieces being mounted to rest by one of its edges on the track element delivering the glass plate and having a projection on its underside in the middle near the opposite edge, and means at the succeeding track element receiving the glass plate for supporting each bridge piece by its said projection.

3. In a glass plate feed track comprising a rotary roll and a stationary guiding member, a bridge between said roll and the guiding member, this bridge consisting of a number of small light plates arranged side by side parallely of the axis of the roll, each of said plates being mounted to loosely rest by one of its edges on the surface of the said roll, a groove in the guiding member at the edge adjacent to the roll, and a small narrow projection on the underside of each bridge plate in the middle thereof, adapted to be loosely received in the said groove of the stationary guiding member.

4. In a glass plate feed track, comprising successive spaced elements, a bridge between adjacent elements, said bridge having one entire edge in contact with one element and only a limited portion of its other edge in contact with the succeeding element.

5. In a glass plate feed track comprising successive elements, a bridge between adjacent elements, said bridge resting through one edge entirely on one element and the point of contact on the succeeding element being narrower than the receiving surface of said bridge.

6. In a glass plate feed track consisting of successive spaced elements, a bridge between adjacent elements, said bridge being supported through its entire edge by one element and on the other element by a projection which has a bearing surface narrower than the receiving surface of the bridge.

7. In a glass feed track comprising successive elements, a bridge between adjacent elements, said bridge resting entirely by one edge on one element with a point of contact on the succeeding element narrower than the point of contact of the other edge of said bridge.

8. A bridge for a glass plate feed track, said bridge having a point of contact along one edge thereof and a narrower point of contact on the other edge.

In testimony whereof I have signed my name to this specification.

RICHARD GENENGER.